United States Patent

[11] 3,593,837

| [72] | Inventor | Clifford R. Loomis, Jr.<br>Beloit, Wis. |
|---|---|---|
| [21] | Appl. No. | 797,104 |
| [22] | Filed | Feb. 6, 1969 |
| [45] | Patented | July 20, 1971 |
| [73] | Assignee | Riegel Paper Corporation |

[54] PACKAGING MACHINE
3 Claims, 10 Drawing Figs.

[52] U.S. Cl. .................................................. 198/35,
53/159, 198/24
[51] Int. Cl. ............................................... B65b 35/30,
B65g 47/52, B65g 57/10
[50] Field of Search .......................................... 198/24, 35,
37; 53/159

[56] References Cited
UNITED STATES PATENTS
2,315,670 4/1943 Tascher ...................... 198/32

3,398,842 8/1968 Schickle ..................... 198/32 X
*Primary Examiner*—Edward A. Sroka
*Attorney*—Wolfe, Hubbard, Voit & Osann

ABSTRACT: Stationed adjacent a packaging machine with two points for feeding out lines of filled packages are two receiving conveyors positioned end-to-end for movement in opposite directions. One end of each conveyor is adjacent a respective one of the feed-out points for receiving the line of packages. After being collected in groups of a predetermined size on each receiving conveyor, the packages are automatically placed on a transferring conveyor by a transferring mechanism for movement to a cartoner. The transferring mechanisms are located at each receiving conveyor and are activated in sequence with one another and with the movement of the transferring conveyor.

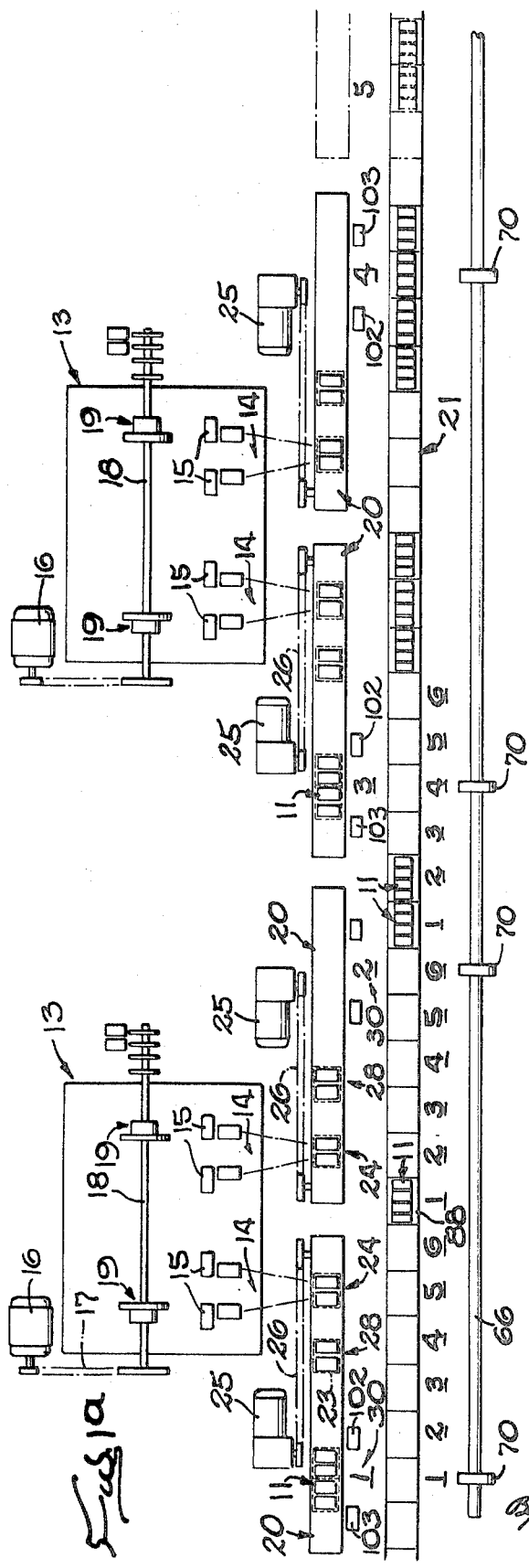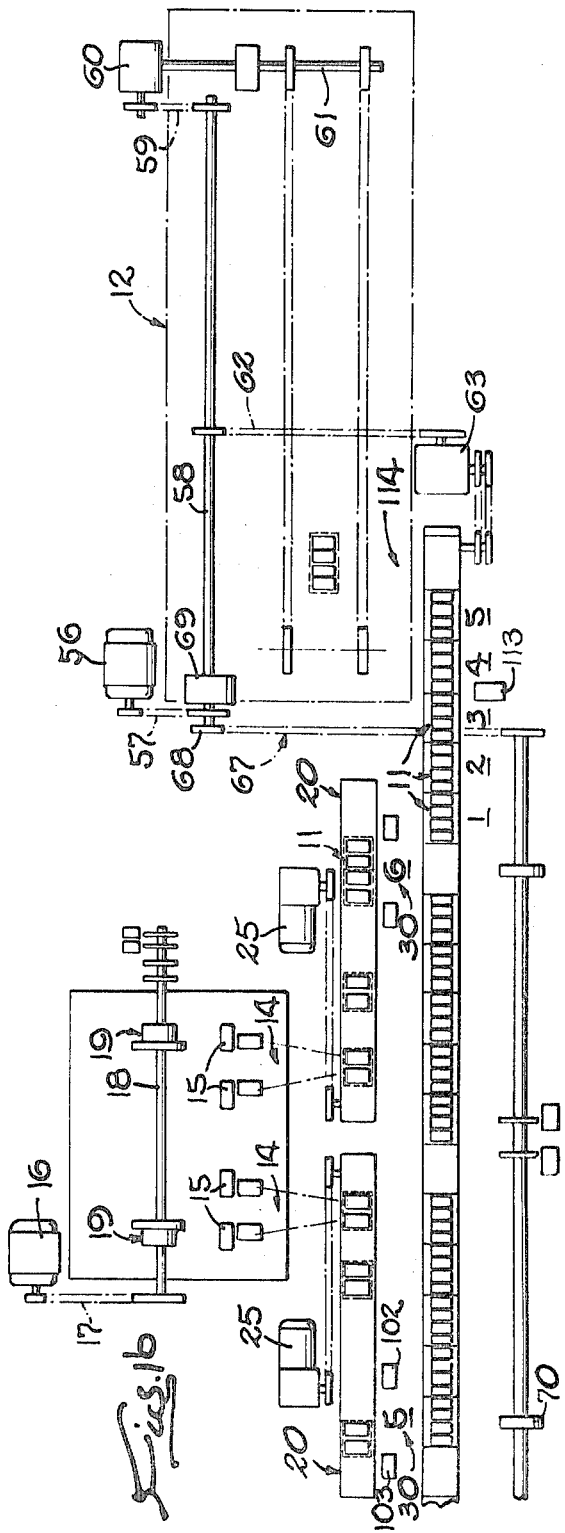

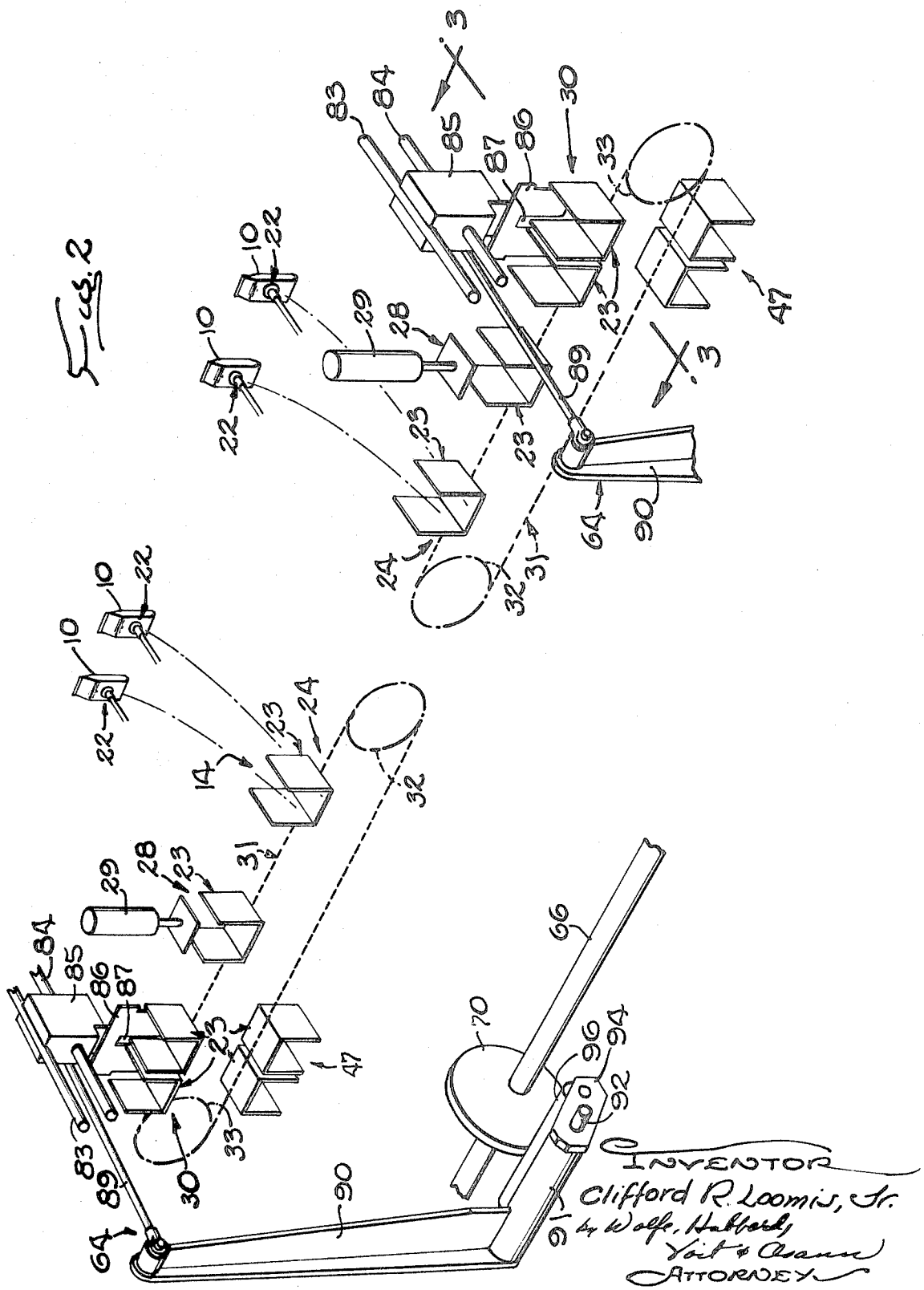

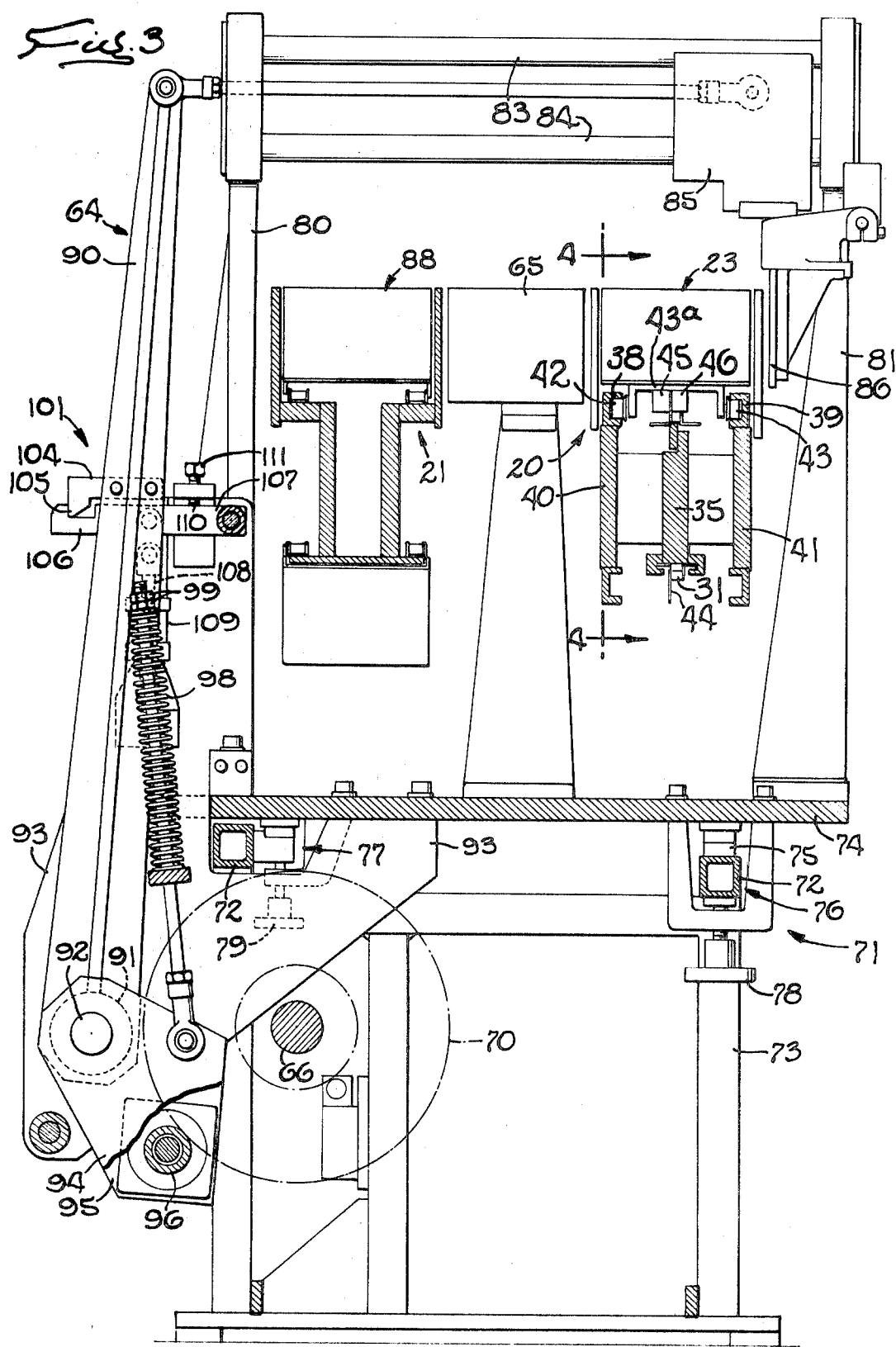

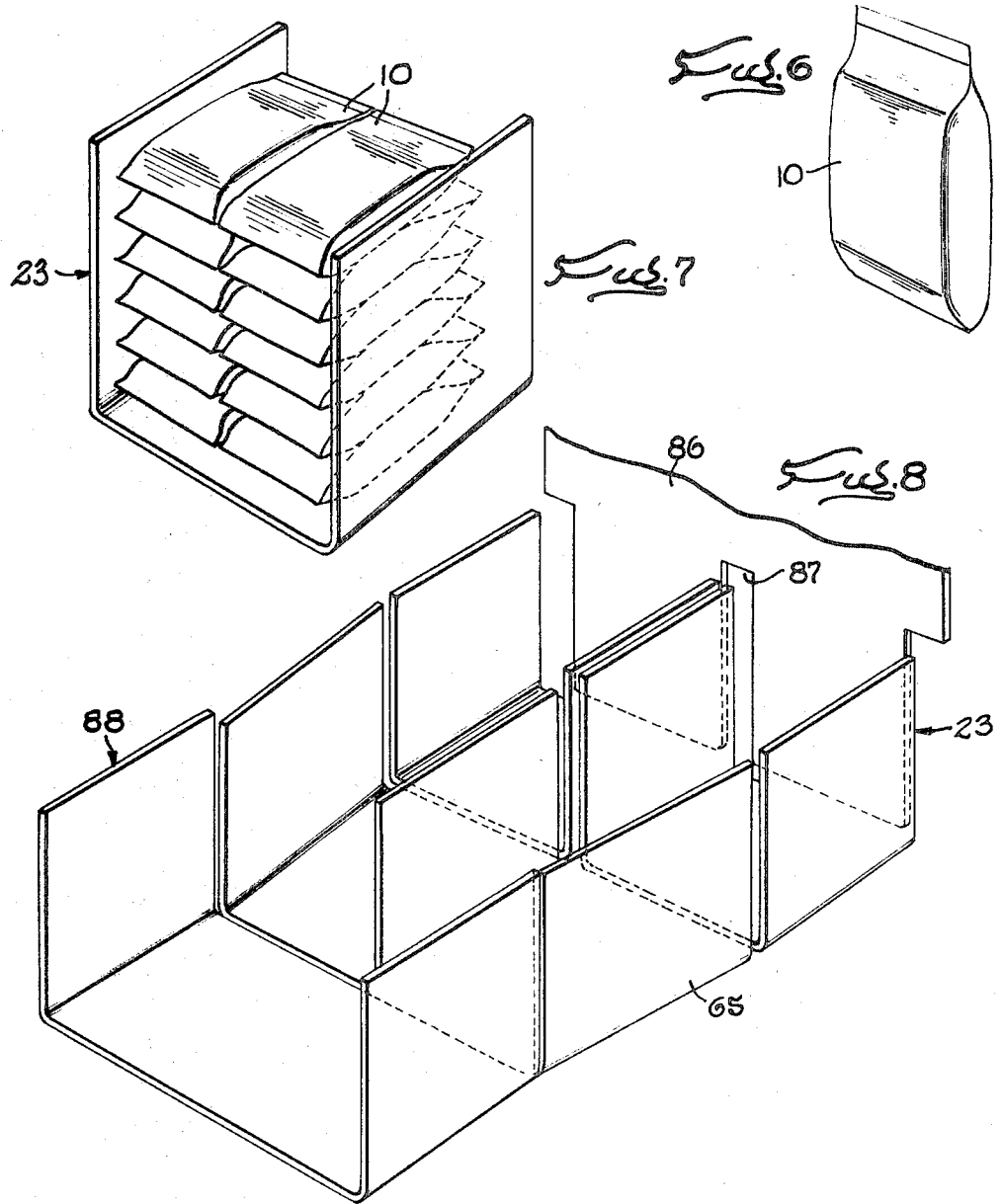
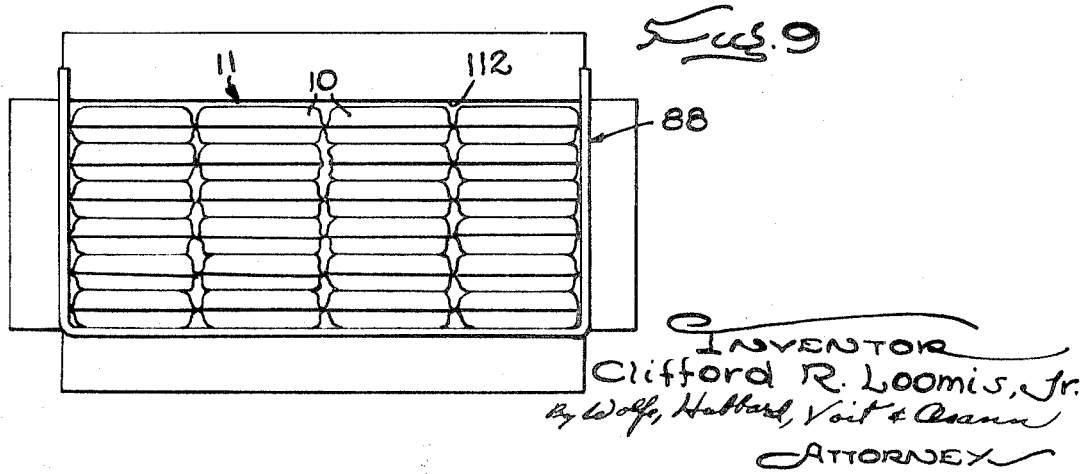

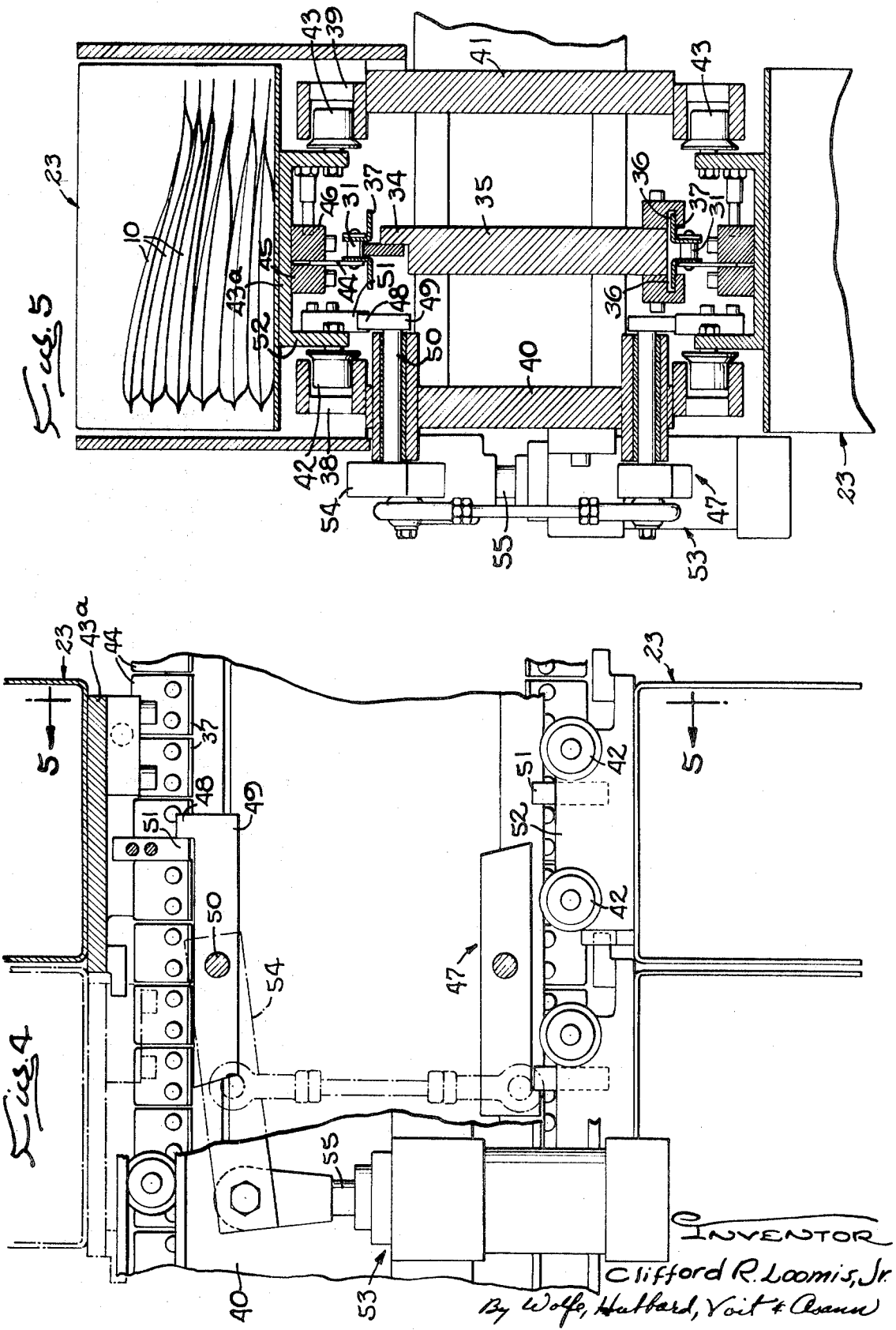

PACKAGING MACHINE

BACKGROUND OF THE INVENTION

The invention relates to a packaging machine systems in which some item, is placed in packages by a packager and then the packages are placed on a conveyor for movement to a cartoner. Either at the cartoner or at some prior point, the packages are collected in groups of predetermined number for insertion into cartons.

SUMMARY OF THE INVENTION

The primary aim of the present invention is to arrange a packaging machine system in a novel manner so that a plurality of packaging machines can feed-out their productions of packages which are then collected in groups of predetermined number on a series of conveyors and the groups are transferred to a common conveyor leading to a cartoner. With this arrangement, any member of machines less than the total may be shut down, as for repairs, and the system will still deliver packages in groups of predetermined number to the conveyor leading to the cartoner.

In one aspect of the invention, a more specific object is to accomplish the foregoing by using a packaging machine that feeds out lines of packages from adjacent feed-out points and by placing a pair of receiving conveyors end-to-end for movement in opposite directions to receive the packages and collect the latter in groups of predetermined number.

BRIEF DESCRIPTION OF THE DRAWINGS

FIG. 1 is a plan view in two parts, due to space, showing the novel packaging machine system of the present invention.

FIG. 2 is an enlarged perspective showing portions of the mechanism for transferring groups of packages from the receiving conveyor to the transferring conveyor.

FIG. 3 is an enlarged cross section taken substantially along line 3–3 of FIG. 2.

FIG. 4 is an enlarged fragmentary cross section taken substantially along line 4–4 of FIG. 3.

FIG. 5 is an enlarged fragmentary cross section taken substantially along line 5–5 of FIG. 4.

FIG. 6 is an enlarged perspective of a package.

FIG. 7 is an enlarged perspective of a group of packages in a bucket.

FIG. 8 is an enlarged fragmentary perspective of the buckets on the receiving and transferring conveyors lines up with a bridge for transferring packages from one conveyor to the other.

FIG. 9 is an enlarged plan view of a group of packages inserted in a carton.

DETAILED DESCRIPTION OF THE PREFERRED EMBODIMENT

While the invention is applicable to a large variety of machines and articles, it is shown in the drawings for purposes of illustration incorporated in a machine which packages a product, such as peanuts, in packages 10, collects the packages in groups of a predetermined number 11 and transfers and conveys the groups along predetermined paths. During this movement, the packages 10 are tamped and are carried to a cartoning machine 12 for insertion into cartons.

As shown in FIG. 1, a plurality of packaging machines 13, herein three but any number will do, are arranged in spaced side-by-side relation. Each machine fills two pairs of lines of packages bringing them to two pairs of feed-out points 14 where they are checked in a known fashion through the use of limit switches 15 to assure that each package 10 is properly filled. To drive the packaging machines 13, a motor 16 through a belt 17 turns a drive shaft 18 which delivers power through independently operable clutches 19 to each pair of lines. Because of the two independently operable clutches 19, each pair of lines may be shut down individually, as for repairs, or to cut production.

In accordance with the present invention, the packagers, conveyors, collecting mechanisms, and transfer mechanisms are constructed and correlated with each other in a novel manner to give an improved and more dependable system for taking packages from a plurality of packages, collecting the packages in groups of predetermined number, and placing all the groups on a single conveyor for movement to another area of operation. For these purposes, a receiving conveyor 20 is positioned opposite each packager 13 and a single transferring conveyor 21 is positioned along side all the receiving conveyors 20. After being placed on the receiving conveyors from the packagers, the packages are collected in groups of predetermined number 11 and then transferred to the transferring conveyor 21 with this arrangement, anywhere from one to all but one of the packagers 13 may cease to operate and the transferring conveyor will still receive and deliver groups of packages from the operating machine or machines.

For receiving the packages 10 from the packager 13, the receiving conveyor 20 is positioned adjacent the pair of feed-out points 14. Delivering the packages from the packager to the receiving conveyor is a conventional suction cup transfer device 22 (FIG. 2) which picks off successive packages in the vertical direction and turns them into horizontal positions while carrying them to the receiving conveyor. With the feed-out points 14 in pairs (FIGS. 1 and 2), two suction cup transfer devices 22 (FIG. 2) work in unison to deliver the output of both feed-out points to a single bucket 23 stationed at a receiving station 24 on one end of the receiving conveyor 20.

In the present instance, two horizontal receiving conveyors 20 positioned end-to-end with the receiving station 24 on the adjacent ends are located adjacent the pairs of feed-out points 14 of each machine 13 with the receiving station 24 of each being adjacent a respective pair of feed-out points 14. With this end-to-end arrangement, each conveyor is powered to move the packages 10 along the conveyor 20 by a motor 25 connected to the conveyor 20 by a belt 26, which results in the conveyors of each pair moving in opposite directions.

To move the packages along the receiving conveyor 20, a plurality of buckets 23 are mounted on the frame of the receiving conveyor for movement with it about an endless track (FIG. 2). So that various operations may be performed on the packages 10, the buckets 23 must be able to remain in different locations on the receiving conveyor for varying lengths of time. First, a bucket 23 is held at the receiving station 24 until twelve packages have been placed in it in two stacks of six each, then the bucket moves to a tamping station 28 where a tamper 29 tamps the packages 10 to give an even distribution both of the goods in the packages and of the packages in the stacks. The tamper is activated by the suction cup transfer device 22 so that each bucket is tamped six times as the next bucket is filled. From the tamping station, the bucket 23 moves to a transferring station 30 where two buckets at a time are collected and 24 packages at a time are transferred to another conveyor and then the empty buckets move under the receiving conveyor until needed at the receiving station 24.

To effect the dwelling ability of the buckets, a conveyor chain 31 (FIGS. 2 and 5) is disposed in a vertical plane and trained about horizontally spaced sprocket wheels 32 and 33 (FIG. 2) journaled on shafts (not shown) at each end of the receiving conveyor 20. As shown in FIG. 5, the upper run of the conveyor chain slides along a guide strip 34 on top of a central rail 35 and the lower run is braced against sagging by grooved guides 36 slidably receiving laterally projecting lugs 37 fast on the chain links. Each bucket is supported and guided independently of the conveyor chain 31 by means of two endless tracks 38 and 39 (FIG. 5) mounted on side rails 40 and 41 of the receiving conveyor 20 and defining laterally opening grooves loosely receiving two rollers 42 and 43 journaled on a bracket 43a on the underside of the bucket.

To adapt the chain conveyor 31 for connection to the buckets 23, generally rectangular plates 44 (FIG. 5) are fastened to one side of the chain in closely spaced relation in a common vertical plane thereby forming a substantially continuous flexible friction band on the chain. On the underside of each bucket is a slip-friction connector comprised of two clamping blocks 45 and 46 which grip this band and thus couple the bucket to the conveyor for movement therewith.

With this arrangement, control of the movement of the buckets 23 along their path may be accomplished by placing simple movable stops in selected locations along the path for engagement with an opposed surface on the buckets and movable out of the way to release the buckets. Such stops are located at the receiving station 24, the tamping station 28, the transferring station 30 and at a storage station 47 (FIGS. 2 and 4) along the lower run. As shown in FIGS. 4 and 5, the stop is a lug 48 projecting upwardly from the right end of a generally horizontal lever 49 pivoted intermediate its ends on the rail 40 by means of a pin 50 fast in a hole in the lever and supported on the rail.

In the position of the lever shown in full in FIG. 4 the stop lug is disposed in the path of a block 51 bolted to one of the depending legs 52 of the bracket on the underside of the bucket. Upon engagement of the two opposed stop elements, the bucket is stopped and, in effect, uncoupled from the chain conveyor as the friction band slips between the clamping blocks 45 and 46. Thus, the bucket 23 is precisely positioned along its path according to the movement of the stop lug.

To move the stop lug 48 into and out of the blocking position at appropriate times a pneumatic cylinder actuator 53 is mounted on a bracket on the outer side of the rail 40 and connected to an operating arm 54 fast at one end on the outer end of the pivot pin 50, the piston rod 55 being pivotally connected to the free end of the arm so that reciprocation of the piston rod rocks the arm up and down. Through the pivot pin 50, this rocks the stop lever 49 through a corresponding arc. When the piston rod is retracted as shown in FIG. 4, the stop lug is held in the raised, blocking position for engagement with the stop blocks 51 and when the rod is extended to swing the free end of the operating arm upwardly, the stop lug is lowered out of the blocking position. For specific details of a conveyor and buckets suitable for use in this type of machine, reference should be made to U.S. Pat. No. 3,370,549.

As best shown in FIG. 1, the transferring conveyor 21 is positioned parallel with and adjacent to all the receiving conveyors 20 and it extends beyond the last receiving conveyor to carry the groups of packages 11 to a cartoner 12 for insertion of the packages into cartons. To drive the cartoner 12 and the transferring conveyor 21, a motor 56 through a belt 57 rotates a drive shaft 58 and, at the right end (FIG. 1) of the drive shaft, a belt 59 and gearing 60 transmit power to a second drive shaft 61 from which power is taken to run the cartoning cycle. From a point intermediate the ends of the first drive shaft 58, rotary motion is transmitted by a belt 62 to a Geneva device 63 which converts the rotary motion to intermittent motion for driving the transferring conveyor in a manner matched to the cycle of the cartoner such that for each full cycle of the cartoner, the transferring conveyor is moved one space to bring another group of packages 11 in line with the cartoner.

At each transfer station 30 on the receiving conveyors 20, a transferring mechanism 64 (FIGS. 2 and 3) pushes the packages from the receiving conveyor across a bridge 65 to the transferring conveyor 21. The transferring mechanisms are arranged to act in sequence such that, for each move of the transferring conveyor, one of the transferring mechanisms is activated. Thus, with the arrangement illustrated, each transferring mechanism is activated once in six moves of the transferring conveyor and the transferring stations are located such that the group of packages 11 from the transferring station of the No. 1 receiving conveyor (FIG. 1) always is placed in a No. 1 space on the transferring conveyor and the group of packages from the transferring station of the No. 2 receiving station will be placed in a No. 2 space, etc.

To effect the sequenced operation of the transferring mechanisms 64, a cycle shaft 66 (FIGS. 1, 2 and 3) extends along the transferring conveyor 21, and is powered by a belt 67 trained over a pulley 68 connected to reduction gearing 69 on one end of the first drive shaft 58 of the cartoner 12. In this instance, the reduction gearing 69 is arranged so the cycle shaft rotates once for every six cycles of the cartoner. Fast on the cycle shaft 66 at each transfer station 30 is a cam 70 (FIG. 1) with an appropriate cam shape, and the high point of the rise on succeeding cams spaced in sequence every 60° around the circumference of the cycle shaft such that during rotation of the cycle shaft the high point of the rise of a cam will contact a cam follower every one-sixth of a rotation.

At every transfer station 30, the transferring mechanism 64 is mounted on a table support 71 (FIG. 3) and arranged to allow sliding adjustment of the transferring mechanism in a horizontal direction to compensate for any stretch in the chain on the transferring conveyor 21. Cross rails 72 connect legs 73 at a point below the top of the legs, and a table top 74 resting on the top of the legs 75 is held in place by clamps 76 and 77 which are rigid with the table top 74. By turning the screws 78 and 79 in one direction, the clamps will rigidly connect the table top to the cross rails 72 and, by turning the screws in the opposite direction, the clamps are loosened and the table top can be slid horizontally with respect to the legs 73 and cross rails 72.

Bolted to and extending upward from the table top 74 at the right and left sides (FIG. 3) are supports 80 and 81 for sliding mechanism 82 which slides the packages 11 from the receiving conveyor 20 across a bridge 65 to the transferring conveyor 21. The sliding mechanism comprises two guide rods 83 and 84 connected between the upper ends of the supports 80 and 81, and the two rods slidably mount a sliding block 85 from which a push plate 86 depends. In this instance, the push plate has a slot 87 (FIG. 2) up its middle allowing it to straddle the adjoining sides of adjacent buckets so that the contents of two buckets 23 on the receiving conveyor 20 may be pushed into one bucket 88 (FIG. 3) on the transferring conveyor. A pull rod 89 is pivotally connected at one of its ends to the sliding block 85 and at its other end to the top of an actuating arm 90.

To effect the transferring movement of the sliding block 85, the actuating arm 90 is rigidly connected at its lower end to a hub 91 (FIGS. 2 and 3) whose ends are journaled by trunnions 92 in support plates 93 (one shown in FIG. 3) extending from the tabletop 74. Two arms 94 and 95 rigid with the ends of the hub 91 and extending downwardly to the right (FIG. 3) rotatably support a cam follower in the form of an elongated roller 96 pressed against the cam 70 on the cycle shaft 66. To keep the cam follower 96 pressed against the cam 70, and, thus, to supply power for moving the sliding block to the left (FIG. 3), a rod 97 pivotally connected to one of the arms 94 is biased in an upwardly direction by a spring 98. Telescoped over the upper end of the rod 97, the spring 98 is compressed between a nut 99 at the upper end of the rod and a plate 100 which is telescoped over the rod and rigid with one of the support plates 93. As the cam follower 96 follows the cam 70 from the high point of the rise to the low point of the fall under the influence of the spring, the hub 91 is rotated counterclockwise (FIG. 3) swinging the actuating arm 90 to the left, thus pulling the sliding block along the rods 83 and 84 and transferring a group of packages 11 from the receiving conveyor 20 to the transferring conveyor 21. As the cam rotates from the low point of the fall to the high point of the rise, the reverse process occurs and, against the force of the spring, the actuating arm returns the sliding block 85 to the position shown in FIG. 3, ready to transfer another group of packages.

A locking mechanism 101 holds the actuating arm 90 at the high point of the rise on the cam cycle (FIG. 3) unless a given signal from limit switches 102 and 103 (FIG. 1) that a proper group of packages is in position at the transfer station 30 on the receiving conveyor. When the signal is given by the limit switches, the locking mechanism releases the actuating arm and it moves as dictated by the cam cycle. As shown in FIG. 3, the locking mechanism 101 comprises an L-shaped latch 104 fast on the actuating arm 90 with the short leg 105 of the "L"

facing down. A keeper 106 with a notch to receive the latch leg 105 is pivotally mounted at one end 107 on the support 93. Pivotally connected to the midpoint of the keeper 106 is a piston rod 108 of a pneumatic cylinder 109 which is mounted on the support 80. Through the admission of air into the cylinder, in response to signals from the limit switches 102 and 103 the piston rod is extended swinging the keeper upwardly in an arc about its pivotally attached end 107. To prevent the keeper from being pushed past the normal position of the latch when the actuating arm 90 is moving, a stop 110 fast on the support 93 defines the upper limit of movement of the keeper and the exact position in which the keeper is stopped can be adjusted by turning a capscrew 111 in the stop. In full operation, the keeper 106 will not engage the latch 104 as the proper load will be at the transferring station 30 every cycle and the limit switches will so signal before locking occurs.

After being loaded on the transferring conveyor 21, the groups of packages 11 are taken to the cartoner 12 which places each group of 24 packages in a carton 112 (FIG. 9) and seals the carton. A limit switch 113 at the entry of the transferring conveyor into the cartoner area checks that each numbered position (FIG. 1) on the transferring conveyor has a full group of packages. If the limit switch 113 shows a full group of packages, a signal is sent to the cartoner to pull down a carton. In this way, an open carton and a group of packages arrive at the insertion point 114 at the same time. When the limit switch 113 does not show a full group of packages, no carton is pulled down.

With this arrangement, when each packager 13 is working to capacity, a steady stream of groups of packages 11 is fed into the cartoner. If for any reason, one side of one packager is not operating, the packages from the remaining side and from the other packagers will still be collected in groups and feed into the cartoner, but the transfer mechanism 64 at the transfer station 30 corresponding to the nonoperating side will not go through the transferring cycle due to its failure to receive an unlocking signal from the limit switches 102 and 103 and the cartoner 12 will fail to prepare every sixth carton due to its signal that every sixth space on the transferring conveyor 21 is vacant. It is apparent that this machine will continue to deliver groups of packages to the cartoner as long as at least one side of one packager is operating at any rate, and that other packagers can stop and start operation at will with the packages from each being collected in groups and transferred to the transferring conveyor for movement to the cartoner. While the machine has been described and illustrated with three packages 13 each with two feed out points 14, it is apparent that any number of packagers and feed out points may be used.

I claim:

1. In a packaging machine system, the combination of two packagers positioned side by side and feeding out a line of packages from adjacent feed-out points, two receiving conveyors active in a horizontal direction and positioned end-to-end for movement in opposite directions, the adjacent ends of said receiving conveyors being positioned opposite the respective ones of said feed-out points, means at each of said ends for collecting a given number of packages in a group and then operable to release a group of packages for movement with each of said receiving conveyors, a transfer station at the other end of each said receiving conveyors, a transferring conveyor active in a horizontal direction and at least coextensive with the combined lengths of said receiving conveyors positioned alongside said receiving conveyors, means at each of said transfer stations for transferring a group of packages from said receiving conveyors to said transferring conveyor, control means interacting between said transferring conveyor and each of said transferring means for activating said two transferring means in sequence and for moving said transferring conveyor a given distance with the activation of each said transferring means whereby said transferring conveyor will continue to receive groups of packages as long as at least one of said packages feeds out a line of packages.

2. In a packaging machine system, the combination of a plurality of packagers each feeding out a line of packages from respective feed-out points, a plurality of receiving conveyors active in a horizontal direction and each having one end positioned opposite a respective one of said feed-out points, means at each of said one ends for collecting a given number of packages in a group and then operable to release a group of packages for movement for each said receiving conveyors, a transfer station at the other end of each of said receiving conveyors, a transferring conveyor active in a horizontal direction and at least coextensive with the combined lengths of said receiving conveyors, said transferring conveyor being positioned alongside said receiving conveyors, means at each of said transfer stations for transferring a group of packages from said receiving conveyors to said transferring conveyor, control means interacting between said transferring conveyor and each of said transferring means for activating said transferring means in sequence and for moving said transferring conveyor a given distance with the activation of each of said transferring means whereby said transferring conveyor will continue to receive groups of packages as long as at least one of said packages feeds out a line of packages.

3. In a packaging machine system, the combination of a plurality of packagers each feeding out a line of packages from respective feed-out points, a plurality of receiving conveyors active in a horizontal direction and each having one end positioned opposite a respective one of said feed-out points, means at each of said one ends for collecting a given number of packages in a group, mechanism responsive to the collection of said given number and operable to release the group of packages for movement with each said receiving conveyors; a transfer station at the other end of each of said receiving conveyors, a transferring conveyor active in a horizontal direction and at least coextensive with the combined lengths of said receiving conveyors, said transferring conveyor being positioned alongside said receiving conveyors, and means at each of said transfer stations for transferring a group of packages from said receiving conveyors to said transferring conveyor, whereby said transferring conveyor will continue to receive groups of packages as long as at least one of said packagers feeds out a line of packages.